United States Patent [19]
Scott

[11] 3,756,692
[45] Sept. 4, 1973

[54] PHOTOCHROMIC PROTECTIVE EYE SHIELD LENS

[75] Inventor: Donald D. Scott, Silver Spring, Md.

[73] Assignee: The Johns Hopkins University, Baltimore, Md.

[22] Filed: July 15, 1971

[21] Appl. No.: 162,836

[52] U.S. Cl. ............... 350/160 P, 2/14 J, 219/147, 350/1
[51] Int. Cl. ............................................ G02b 5/22
[58] Field of Search ................... 350/1, 2, 160 P; 2/8, 14 J; 219/147; 351/163

[56] References Cited
UNITED STATES PATENTS

| | | | |
|---|---|---|---|
| 3,269,267 | 8/1966 | Collins | 350/160 P |
| 3,225,357 | 12/1965 | Johnson | 2/14 J |
| 3,635,544 | 1/1972 | Stamm et al. | 350/160 P |
| 3,436,353 | 4/1969 | Dreyer et al. | 350/160 P |
| 3,152,215 | 10/1964 | Barstow et al. | 350/160 P |

Primary Examiner—David Schonberg
Assistant Examiner—Ronald J. Stern
Attorney—John S. Lacey and Robert E. Archibald

[57] ABSTRACT

A protective lens structure of variable opacity for installation in a welder's face shield to provide decreasing radiation transmission through the structure with increasing radiation impingement on the structure. The optical density of photochromic material within the lens structure varies according to the intensity of the radiation produced by the welding instrument. The photochromic material is held between an ultraviolet (UV) transmitting frontal lens and a UV-absorbing rear lens, the frontal lens having a coating with low infrared (IR) transmittance and the rear lens having a UV-reflective coating. The frontal lens essentially blocks IR while transmitting UV and visible light to the photochromic material. The UV radiation striking the front surface of the photochromic material activates the material, causing it to become optically dense. Any UV radiation transmitted through the photochromic material is reflected back into the material by the UV-reflective coating on the rear lens, thereby activating the material over the rear surface thereof. Incident radiation in the visible spectral range is predominately absorbed by the activated photochromic material. Any UV-radiation transmitted through the reflective coating is absorbed by the rear lens to prevent transmission to the user's eyes.

5 Claims, 5 Drawing Figures

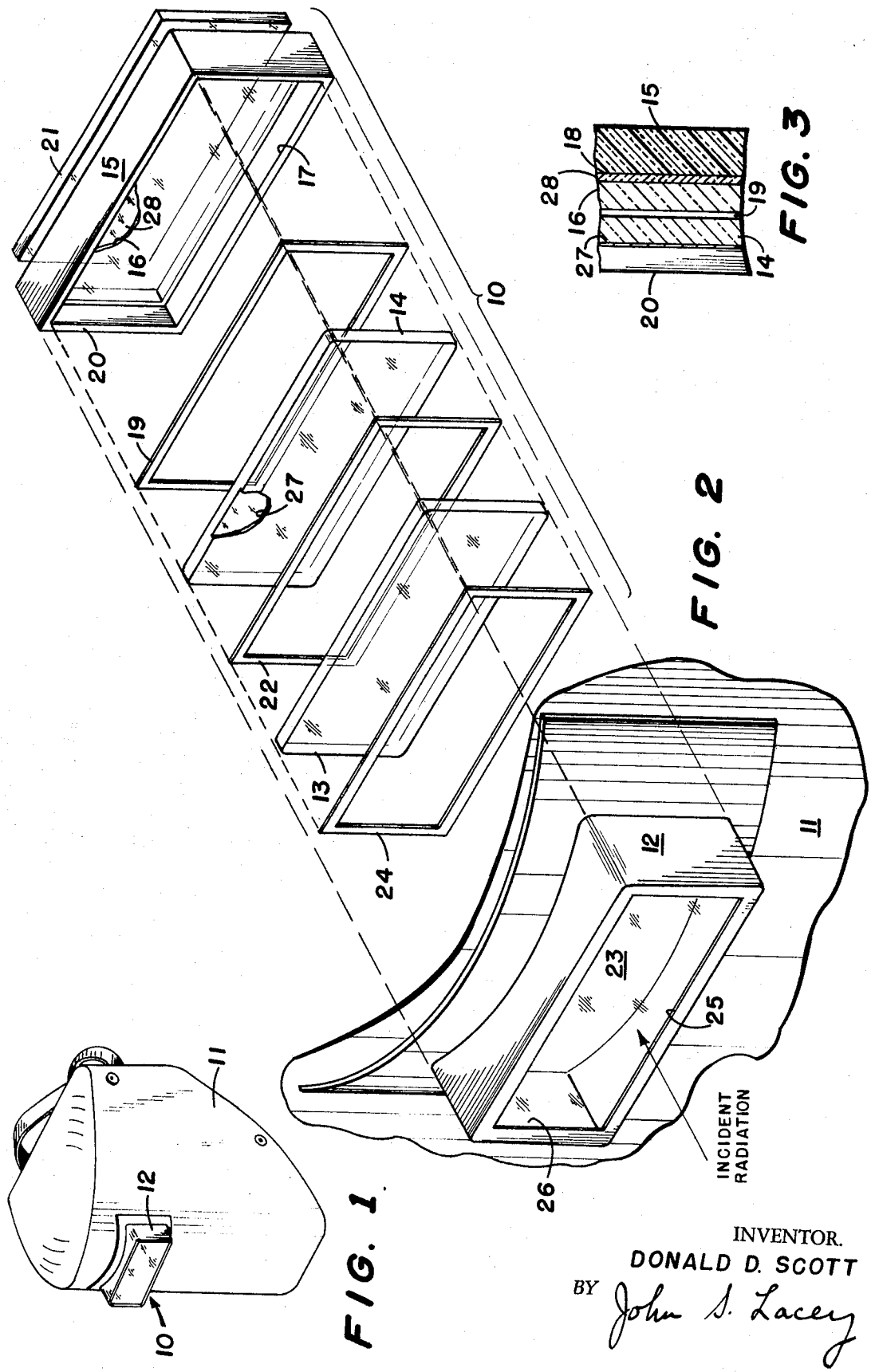

INVENTOR.
DONALD D. SCOTT

PHOTOCHROMIC PROTECTIVE EYE SHIELD LENS

STATEMENT OF GOVERNMENT INTEREST

The invention herein described was made in the course of or under a contract or subcontract thereunder, with the Department of the Navy.

BACKGROUND AND SUMMARY OF THE INVENTION

Protective face shields for welders usually employ glass or plastic optical filtering lenses of predetermined optical density. These prior filtering lenses must be sufficiently opaque to protect a user's eyes at the upper operating extremes of the welding torch. Use of the torch in the lower operating ranges is thus rendered more difficult due to the small amount of visible light transmitted through the lens. Prior art lenses also transmit virtually no light when the welding torch is not lit, thereby rendering address of the work prior to and during torch activation relatively difficult. In this dim illumination, the pupillary diameter of the user's eyes approaches the maximum 8 millimeters diameter opening and decreases the resolution of the eyes to form clear images of the work objects being addressed. Resolution is maximized when the pupillary diameter is between 3 to 4 millimeters where the illumination is nominal.

The invention provides a passive protective lens structure containing a photochromic material which may be permanently or replaceably installed in a welder's face shield. Due to the nominal illumination resulting initially from the relatively clear or open state of the lens assembly, sufficient visible light is transmitted through the present lens structure prior to torch activation to enable the user to view the piece to be welded.

Torch light-up produces a flame rich in ultraviolet radiation; the intensity of the radiation at any given wavelength being dependent on the temperature of the flame. This radiation impinges on the lens structure and causes the photochromic material in the lens structure to become optically dense to the incident radiation in order to protect the eyes of the user while still allowing sufficient visible light transmission to enable performance of the welding operation. A welding torch operates within a wide range of flame temperatures. If the user increases the flame temperature, thus the output of electromagnetic radiation, the increased ultraviolet radiation to which the photochromic material is exposed causes a correspondingly increased degree of opacity in the material. The present protective lens is therefore seen to automatically provide the variable degree of protection required by ambient conditions. Increased opacity of the lens structure caused by an increased torch flame temperature does not substantially restrict the user's vision, since, although a smaller percentage of ambient visible radiation is transmitted through the lens, the total visible radiation produced by the torch is increased. Thus, the invention provides protection to a user throughout the dynamic range of the welding process.

Essentially, the invention is a protective lens structure capable of instantaneous and variably opaque response to an intense source of electromagnetic radiation. In the most refined sense, the invention is a lens structure for a welder's face shield, the structure passing sufficient visible radiation when not being acted upon by an intense electromagnetic radiation source to allow a user to initially view his work and further instantaneously preventing passage of all injurious electromagnetic radiation therethrough on exposure to such an intense source. The present device employs a photochromic material to produce instantaneous and variable changes in lens opacity. A photochromic material is a substance which undergoes a reversible change in color when exposed to radiant energy. To be useful in the present invention, the photochromic material has a colorless or transparent normal state which, when energized with radiant energy of a predetermined wavelength, becomes colored or optically dense. The photochromic material is incorporated into the present lens structure to render the structure increasingly opaque to the incident electromagnet radiation on increasing exposure to such electromagnetic radiation, particularly ultraviolet radiation. Since the ultraviolet output of a welder's torch is essentially proportional to the degree of injurious risk posed by the torch and since ultraviolet radiation is conveniently useful to darken most photochromic materials, the present invention will be described as a lens structure activated by ultraviolet light for purposes of simplicity; however, it will be understood that other radiation wavelengths and electromagnetic radiation sources may be suitable to activate the present device.

Accordingly, it is an object of the present invention to provide a protective lens structure for a welder's helment which passively darkens in response to the electromagnetic output of the welder'torch to provide a suitable degree of protection to a user's eyes.

Another object of the invention is to provide a protective eye lens structure particularly adapted for use by a welder which will rapidly react to the impingement of electromagentic radiation and transmit minimum amounts of ultraviolet and infrared radiation while transmitting an acceptable level of visible radiation sufficient to enable the wearer to carry on his work function; e.g., welding operation.

Another object of the invention is to provide a protective lens structure for welders which permits uninhibited viewing of the work addressed with nominal eye resolution both prior to torch activation and after extinguishment of the torch.

Another object of the invention is to provide a protective lens structure in which a photochromic material is employed, which photochromic material will become optically dense on activation by a suitable electromagnetic radiation source.

A further object of the invention is the provision of a protective lens which will protect the eye from secondary ultraviolet light.

Another object of the invention is to provide a protective lens structure for welders which passively darkens in response to the electromagnetic output of the welder's torch throughout the dynamic range of most welding processes to provide a suitable degree of protection to the user's eyes.

Still another object of the invention is to provide a protective lens structure in which the structure is instantaneously rendered optically opaque by the impingement of electromagnetic radiation of suitable wavelength thereon without the necessity for ancillary sensing or actuation devices.

Other objects, advantages, and novel features of the invention will become apparent from the following detailed description of the invention.

BRIEF DESCRIPTION OF THE DRAWINGS

FIG. 1 is a perspective of a welder's face shield having the present lens structure incorporated therein;

FIG. 2 is an exploded perspective view of a preferred embodiment of the present lens structure;

FIG. 3 is an enlarged partial cross-sectional view of that portion of the lens structure containing the photochromic material;

DESCRIPTION OF THE PREFERRED EMBODIMENT

Figure 4:
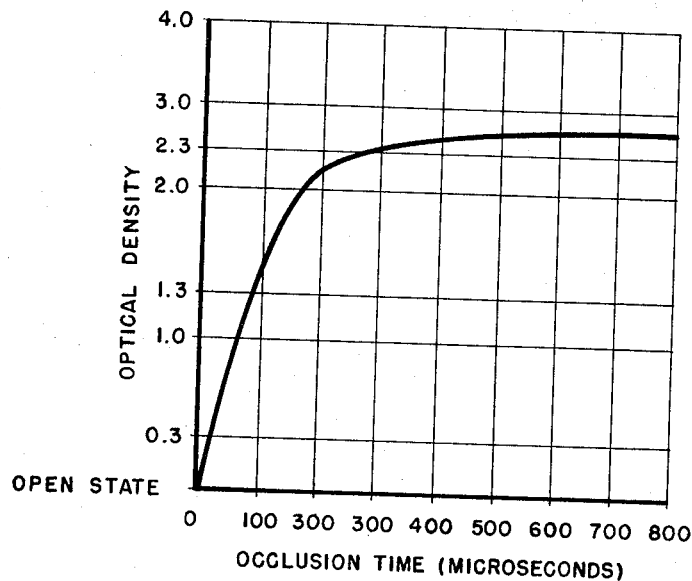
FIG. 4 is a graph illustrating the occlusion time required to achieve a certain degree of optical density for a typical photochromic material; and, FIG. 5 is a graph illustrating the clearing time required by a typical photochromic material at selected temperatures.
Figure 5:
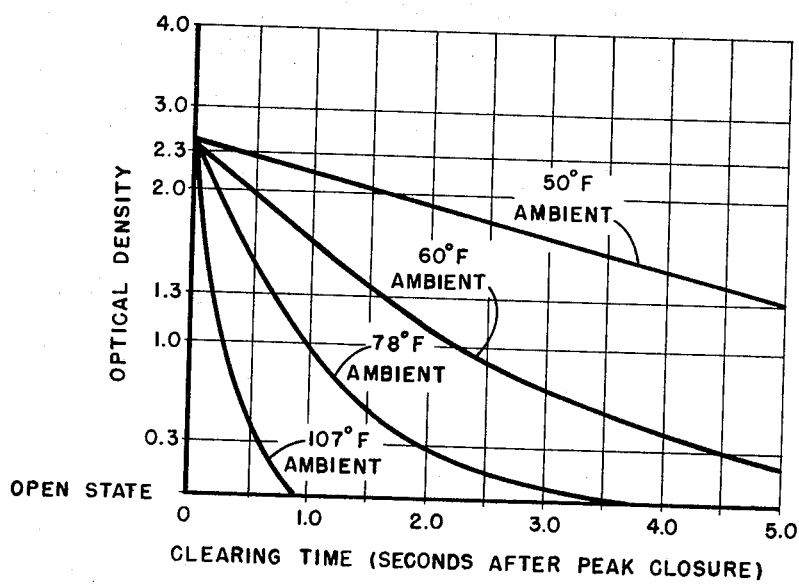

The present invention utilizes photochromic materials which change from transparent states to optically dense states of varying opacity when stimulated or energized by electromagnetic radiation of predetermined wavelengths and intensities. Suitable compounds can be selected from the various photochromic compounds which have been synthesized, each of which has its own characteristic absorptive wavelengths, response time and maximum optical density. Photochromic materials are available in physical forms ranging from sheet material to fluids and jellies. Generally, a photochromic material in solution exhibits greater sensitivity to ultraviolet radiation than does the same material in a dry state. The optical density developed by the photochromic materials used herein is dependent on the equilibrium condition developed between the forward reaction, i.e., the darkening reaction, and the reverse reaction, i.e., the clearing reaction. Thus, the greater the intensity of activating energy applied to the material, the darker the material will become. In this fashion the present invention passively provides increased protection for a user which is commensurate with the risk of injury to which he is exposed.

Most arc weld processes emit spectral energy at temperatures ranging from 2000 K to 30,000 K (except the plasma arc jet which radiates at 50,000 K). In these processes, the radiated wavelength at peak power output moves from the infrared to the ultraviolet as temperature increases and the expected radiant power occurring within or below the upper ultraviolet wavelength boundary increases as the temperature increases. The temperature also increases as the applied welding current increases. Thus the degree of photochromic response increases as the applied welding current increases.

With reference now to the drawings, the proposed lens assembly 10 of the present invention (see FIG. 2) is particularly adapted for use within a welder's face shield 11 such as is illustrated in FIG. 1 and would be suitably held, for example by the usual metal spring (not shown), within the typical glassholder 12 which is mounted on or made integral in the face shield 11. The lens assembly 10 is best seen in FIG. 2 to comprise a partial visible and infrared (IR) radiation sideband filter 13, a frontal ultraviolet (UV)-transmitting lens 14, an ultraviolet (UV)-absorbing rear lens 15, and a layer 16 of photochromic material disposed therebetween. The lenses 14 and 15 are essentially rectangular in shape, the lens 15 having a rectangular recess 17 disposed in the front face thereof for receiving the lens 14 therein. The photochromic layer 16 is also disposed within the recess 17 and over that surface of the lens 15 which forms the "floor," or recessed face 18 (see FIG. 3), of the recess 17. The photochromic layer 16 is essentially "sandwiched" between the lenses 14 and 15 and is sealed therebetween by a seal membrane 19. In order to form the lens assembly 10 into a more compact unit, the lens 14 may fit within the recess 17 with its outer surface flush with the peripheral edges 20 thereof. A partial visible and ultraviolet (UV) radiation sideband filter 21 is located behind lens 15.

Certain photochromic materials which have desirable "closure response times," i.e., darken sufficiently to shield a user's eyes within a very short time period, do not normally screen out electromagnetic radiation over a sufficiently large spectral range to allow use thereof without the sideband filters 13 and 21. One or more of these filters 13 and 21 could be utilized to selectively prevent passage of radiation at certain frequencies or ranges of frequencies through the lens assembly 10 to a user. The filter 13 is spaced from the lens 14 by means of a spacer 22 and is spaced from a UV transparent cover plate 23 by a spacer 24. The cover plate 23 may be replaceably provided at the frontal opening 25 in glassholder 12 to prevent welding splatter from damaging the lens assembly 10. The lens assembly 10 is mounted within the glassholder 12 with the body of the lens assembly 10 fitting flushly against the internal surfaces 26 of the glassholder. The cover plate 23 may, if desired, be designed to selectively block certain wavelengths in the UV spectrum while transmitting other UV wavelengths sufficient to activate the photochromic material 16.

The lens 14 is further seen to have a coating 27 on the front surface thereof which reflects or otherwise blocks infrared radiation. Although the coating 27 could also be disposed on the rear surface of the lens 14, disposition thereof on the front surface of the lens 14 prevents heating of said lens 14 which could be caused by passage thereinto of intense infrared radiation. It is obvious that the IR reflective coating 27 could be equally well applied to the sideband filter 13 instead of lens 14. The lens 15 additionally has an ultraviolet-reflective coating 28 disposed over the recessed face 18 thereof, the coating 28 being located between the photochromic layer 16 and the lens 15 itself.

The lens 14 may be composed of any suitable ultraviolet-transmitting material, such as glass, quartz, or some known clear plastics. Sideband filtering capability for the purpose described for the filter 13 could also be incorporated into the lens 14 by a convenient choice of a large number of readily available materials. Sideband filter 13 may, for example, take the form of a long wavelength transmitting filter such as Bausch and Lomb No 90–2–560. On the other hand, the rear or right-hand absorbent sideband filter 21 in FIG. 2 functions to block visible light between the upper (IR) end of the visible spectrum and a point just above the wavelength at which the photochromic material 16 has maximum effectiveness. Filter 21 might be in the form of a short wavelength transmitting filter such as, for example, Bausch and Lomb No. 90–1–500. Obviously, if desired, the functions of filters 13 and 21 can be combined into a single bandpass transmitting filter. Similarly, the lens 15 may be composed of a suitable ultraviolet-absorbing material, such as polycarbonate of which "Lexan" is a common example. The infrared reflective coating 27 on the lens 14 may be vacuum deposited gold, chromium, or other suitable material. Similarly, the ultraviolet reflective coating 28 may be vacuum deposited aluminum overcoated with magnesium fluoride, lithium fluoride, or other suitable material to retain its highly reflective characteristics.

Operation of the lens assembly 10 is completely passive, radiation from a welder's torch (not shown) impinging on the frontal lens 14 wherein the infrared electromagnetic radiation is reflected or blocked by the coating 27. The visible and ultraviolet radiations are transmitted through the lens 14 and the UV is absorbed in and energizes or activates the photochromic layer 16 over the front surface of the said layer. Any ultraviolet radiation passing through the photochromic layer 16 is reflected from the reflective coating 28 back toward the layer 16, thus additionally energizing the layer 16 over the rear surface thereof. Thus, in a fraction of a second, the photochromic layer 16 is rendered opaque by ultraviolet radiation incident on the front and rear surfaces of the layer 16 and by the radiation passing through the layer 20. Any ultraviolet radiation not absorbed by the photochromic layer 20 or reflected by the coating 28 is absorbed by the lens 18 and the sideband filter 21 to prevent injury to the user. In this activated or optically dense condition, only a small fractional percentage of incident visible light passes through the lens assembly; the actual amounts of electromagnetic radiation transmitted through the lens assembly 10 preferably being in conformance with the values listed in National Bureau of Standards Circular 471 (dated 1948). In any event, the light thus transmitted to a user's eyes, during the closed or activated state of the lens assembly 10, even though a fraction of the total radiation incident on the assembly, is sufficient to enable the user to view his work due to the intensity of the radiation emanating from the welding torch. When the welding torch is extinguished, i.e., the ultraviolet radiation is discontinued, the photochromic layer 16 rapidly loses its opacity and becomes quite transparent to the user, as it was before the torch was struck.

FIG. 4a illustrates a typical occlusion time required to produce a given optical density when the photochromic layer 16 is exposed to a single pulse of ultraviolet radiation of a suitable wavelength. The occlusion time, i.e., the time required for the layer 16 to attain a given optical density is measurable in microseconds, thus producing a desirable lens opacity within a sufficiently small time period to prevent damage to a user's eyes. FIG. 4b illustrates typical clearing times at selected temperatures required for the photochromic layer 16 to lose optical density after exposure to a single pulse of ultraviolet radiation of a suitable wavelength.

The portion 18 of the lens assembly 10 which contains the photochromic material 16 may be fabricated as a disposable unit, if desired, which may be replaced if the photochromic layer 16 should render itself less responsive to electromagnetic stimulation after a period of use fatiguing cycles. The lens assembly 10 may alternatively be embodied in the glassholder 12 as a permanent unit, except that the photochromic layer 16 may be replaceable within holder 15 upon fatigue of said material. As a further alternative, the entire lens assembly 10 can be made as a disposable or rechargeable unit.

The photochromic layer 16 may be composed of one or more photochromic materials in solution or may be a solid layer of one or more photochromic materials, either homogeneously admixed or formed into thin, overlapping layers. More than one photochromic material may prove useful when the several materials show maximum optical density to differing frequency bands in the electromagnetic spectrum, particularly the "visible" spectrum. Such a combination of photochromic materials is often useful without the need for a sideband filter, such as the filters 13 and 21. Alternatively, the photochromic material may be disposed within the lens material itself, such as embedded in the lens 15. A typical photochromic material suited for the invention is the inorganic crystalline calcium fluoride, one of the so-called "alkaline earth compounds." Such a material has optical densities ranging from 2 to 10 on the scale of FIG. 4a and can attain such densities in a fraction of a second. A sheet of such a material 0.1cm thick exhibits up to 75 – 90 percent optical transmission in the unexcited or open state and may undergo 10,000 cycles with less than 10 percent fatigue loss. Although calcium fluoride is described only by way of example of the capabilities of available photochromic materials, this particular material has maximum optical density at 5300A and would therefore likely require either use of sideband filters to assure passage of radiation through the lens assembly 10 only in a restricted band of the electromagnetic spectrum around 5300A or use of other photochromic materials in combination therewith which have effective optical densities in those ranges. Besides inorganic materials, such as calcium fluoride and strontium titanate, organic compounds, such as dimethylindolinobenzopyrylospiran in solution, also present a variety of capabilities from which a suitable photochromic material may be chosen for a particular embodiment of the present invention.

While the protective lens structure described herein has been indicated as a unitary structure useful in a welder's face shield, it should be recognized that two separate structures could be employed (one for each eye) and that the lens assembly 10 could also be incorporated into other apparatus which would be exposed to intense ultraviolet radiation and through which vision is desired. For example, the lens assembly 10 could be used as a window for viewing a process which emits radiation damaging to a viewer's eyes on full exposure thereto. The unique properties of the lens assembly 10 allows a viewer to observe a process producing increasingly intense electromagnetic radiation, at ranges wherein the radiation is dangerous to the eyes, the process being constantly observable without eye damage due to the increasing optical density of the assembly 10 within an extremely short reaction time. In order to insure relatively constant closure and clearing response and to reduce fatiguing characteristics of the photochromic material, means can, if desired, be incorporated in the welder's face shield for example to maintain the photochromic material at a preselected relatively cool temperature, such as 65°F ± 5°.

Since various other modifications of the invention are possible in light of the above-description, it should be understood that, within the scope of the appended claims, the invention may be practiced otherwise than as specifically described.

I claim:

1. A protective lens structure of variable opacity for a welder's helmet, the lens structure providing substantially instantaneous attenuation of radiation transmittance therethrough on exposure to intense electromagnetic radiation and being essentially transparent before and after such exposure, said lens structure comprising:

photochromic means absorptive to ultraviolet radiation and producing an instantaneously effective and variable opacity to visible radiation within the lens structure;

lens means for preventing transmission of infrared radiation and transmitting ultraviolet and visible radiation, said lens means being disposed in front of said photochromic means; and, ultraviolet radiation reflective means disposed in back of said photochromic means for reflecting ultraviolet radiation passing through said photochromic means back into said photochromic means.

2. The lens structure of claim 1, and further including ultraviolet absorption lens means disposed in back of said ultraviolet radiation reflective means.

3. A protective lens structure of variable opacity for a welder's helmet, the lens structure providing substantially instantaneous attenuation of radiation transmittance therethrough on exposure to intense electromagnetic radiation and being essentially transparent before and after such exposure, said lens structure comprising:

a lens for blocking infrared radiation and transmitting ultraviolet and visible radiation therethrough;

a lens for absorbing ultraviolet radiation;

an ultraviolet reflective coating on the front surface of the second-mentioned lens; and, a layer of photochromic material located between said lenses and capable of instantaneously reacting to the impingement of ultraviolet radiation thereon during such exposure for producing variable opacity to visible radiation in the lens structure, the opacity of said photochromic material having a first minimum predetermined value prior to exposure to said intense electromagnetic radiation which instantaneously increases to a second predetermined value during such exposure, said opacity being variable in accordance with the intensity of said electromagnetic radiation and rapidly decreasing to said first minimum predetermined value upon removal of said intense electromagnetic radiation for allowing a user to observe the welding area.

4. A process for rapidly attenuating intense electromagnetic radiation incident on a lens structure comprising a viewing port in a welder's headgear, the process comprising;

blocking the transmission of infrared radiation through the lens structure;

transmitting ultraviolet and visible radiation at least into the interior of the lens structure;

disposing a photochromic material within the interior of the lens structure;

exposing the front surface of the photochromic material to the transmitted ultraviolet radiation thereby to darken the material and prevent transmission through the lens structure of intense visible radiation; and reflecting any ultraviolet radiation transmitted through the photochromic material back into the photochromic material over the rear surface thereof to darken the material.

5. The process of claim 4, and further comprising the step of:

absorbing any ultraviolet radiation transmitted through the lens structure.

* * * * *